United States Patent
Maeda (10) Patent No.: US 10,695,879 B2
(45) Date of Patent: Jun. 30, 2020

(54) MACHINING SYSTEM

(71) Applicant: FANUC CORPORATION, Yamanashi (JP)

(72) Inventor: Yoshihide Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/180,179

(22) Filed: Nov. 5, 2018

(65) Prior Publication Data

US 2019/0160616 A1 May 30, 2019

(30) Foreign Application Priority Data

Nov. 28, 2017 (JP) ................. 2017-228390

(51) Int. Cl.
*B23Q 7/04* (2006.01)
*B25J 15/04* (2006.01)
(Continued)

(52) U.S. Cl.
CPC ............... *B23Q 7/04* (2013.01); *B23Q 7/10* (2013.01); *B25J 15/04* (2013.01); *B25J 15/0491* (2013.01); *G05B 19/00* (2013.01)

(58) Field of Classification Search
CPC .......... B23Q 7/04; B23Q 3/15503; B25J 5/00; B25J 5/04; B65G 61/00
(Continued)

(56) References Cited

U.S. PATENT DOCUMENTS 5,737,827 A * 4/1998 Kuse ................. B23P 19/001
  29/701
6,105,239 A   8/2000 Kuse et al.
(Continued)

FOREIGN PATENT DOCUMENTS

EP      1 524 069 A2    4/2005
JP      S59-115144 A    7/1984
(Continued)

OTHER PUBLICATIONS

Japanese Office Action dated Aug. 6, 2019, in connection with corresponding JP Application No. 2017-228390 (14 pgs., including English translation).
(Continued)

*Primary Examiner* — Ronald P Jarrett
(74) *Attorney, Agent, or Firm* — Maier & Maier, PLLC (57) ABSTRACT

This machining system includes: an automatic warehouse which receives a workpiece type to be moved to a predetermined supply position, and by which the workpiece of the received workpiece type moves to the supply position; a machine tool; a robot that transfers the workpiece moved to the supply position by the automatic warehouse, to a machine tool side, in order for the workpiece to be machined by the machine tool; and a robot control device that controls the robot, wherein the automatic warehouse stores a hand, the automatic warehouse receives a request for a type of hand to be moved to the supply position and moves the hand corresponding to the received request to the supply position, and the robot control device controls the robot to attach thereto the hand supplied to the supply position.

5 Claims, 9 Drawing Sheets (51) Int. Cl.
*G05B 19/00* (2006.01)
*B23Q 7/10* (2006.01)

(58) Field of Classification Search
USPC .................................... 29/701; 414/222.01
See application file for complete search history.

(56) References Cited

U.S. PATENT DOCUMENTS

| | | | |
|---|---|---|---|
| 2005/0095091 | A1 | 5/2005 | Fukada |
| 2005/0107919 | A1* | 5/2005 | Watanabe ............ B25J 9/1656 |
| | | | 700/245 |
| 2016/0236867 | A1 | 8/2016 | Brazeau et al. |
| 2017/0109876 | A1* | 4/2017 | Kitamura ............ B25J 9/1697 |

FOREIGN PATENT DOCUMENTS

| | | |
|---|---|---|
| JP | S62-48478 A | 3/1987 |
| JP | S64-40231 A | 2/1989 |
| JP | H03-245926 A | 11/1991 |
| JP | H03-245928 A | 11/1991 |
| JP | H05-116764 A | 5/1993 |
| JP | H05-78307 U | 10/1993 |
| JP | H06-234018 A | 8/1994 |
| JP | H08-71872 A | 3/1996 |
| JP | H08-257962 A | 10/1996 |
| JP | 2000-233229 A | 8/2000 |
| JP | 2004-237444 A | 8/2004 |
| JP | 2005-118930 A | 5/2005 |
| JP | 2011-150571 A | 8/2011 |
| JP | 5130509 B2 | 1/2013 |
| JP | 2018-513817 A | 5/2018 |
| WO | 2016130338 A1 | 8/2016 |

OTHER PUBLICATIONS

Japanese Office Action dated Dec. 17, 2019, in connection with corresponding JP Application No. 2017-228390 (13 pgs., including machine-generated English translation).

* cited by examiner

MACHINING SYSTEM

CROSS-REFERENCE TO RELATED APPLICATIONS

This application is based on and claims priority to Japanese Patent Application No. 2017-228390 filed on Nov. 28, 2017, the entire content of which is incorporated herein by reference.

FIELD

The present invention relates to a machining system, and more particularly to a machining system including an automatic warehouse that supplies a workpiece, a machine tool, and a robot that transfers the workpiece supplied from the automatic warehouse to the machine tool side.

BACKGROUND

Conventionally, robot fixtures such as a hand or a hand claw to be attached to the tip of a robot are prepared in advance on a tool placing stand around the robot, and an operator changes robot fixtures at the tip of the robot depending on the operation to be performed by the robot.

There is known a machining system including: a conveyor that transfers a panel; a robot that transfers the panel transferred by the conveyor to a machine tool; and a tool transfer machine that transfers a robot fixture such as a hand to be attached to a tip of the robot, to the vicinity of the robot, wherein the robot fixture transferred by the tool transfer machine is attached to the tip of the robot by an operator (for example, refer to Japanese Unexamined Patent Application, Publication No. H05-116764).

SUMMARY

A machining system according to an aspect of the present invention includes: an automatic warehouse that stores workpieces, and moves the stored workpieces to a supply position; a warehouse control device that receives a workpiece type to be moved to the supply position, and controls the automatic warehouse to move the workpiece corresponding to the received workpiece type to the supply position; a machine tool that machines the workpieces; a robot that transfers the workpieces, which are moved to the supply position by the automatic warehouse, to a machine tool side, in order for the workpiece to be machined by the machine tool; a control device that controls the robot, wherein the automatic warehouse stores a robot fixture which is a tool, a hand, or a hand claw to be attached to a tip of the robot, the warehouse control device receives a request for a robot fixture to be moved to the supply position, and controls the automatic warehouse to move the robot fixture corresponding to the received request to the supply position, and the control device controls the robot to attach thereto the robot fixture supplied to the supply position.

DETAILED DESCRIPTION

A machining system according to a first embodiment of the present invention will be described with reference to the drawings.

Figure 1:
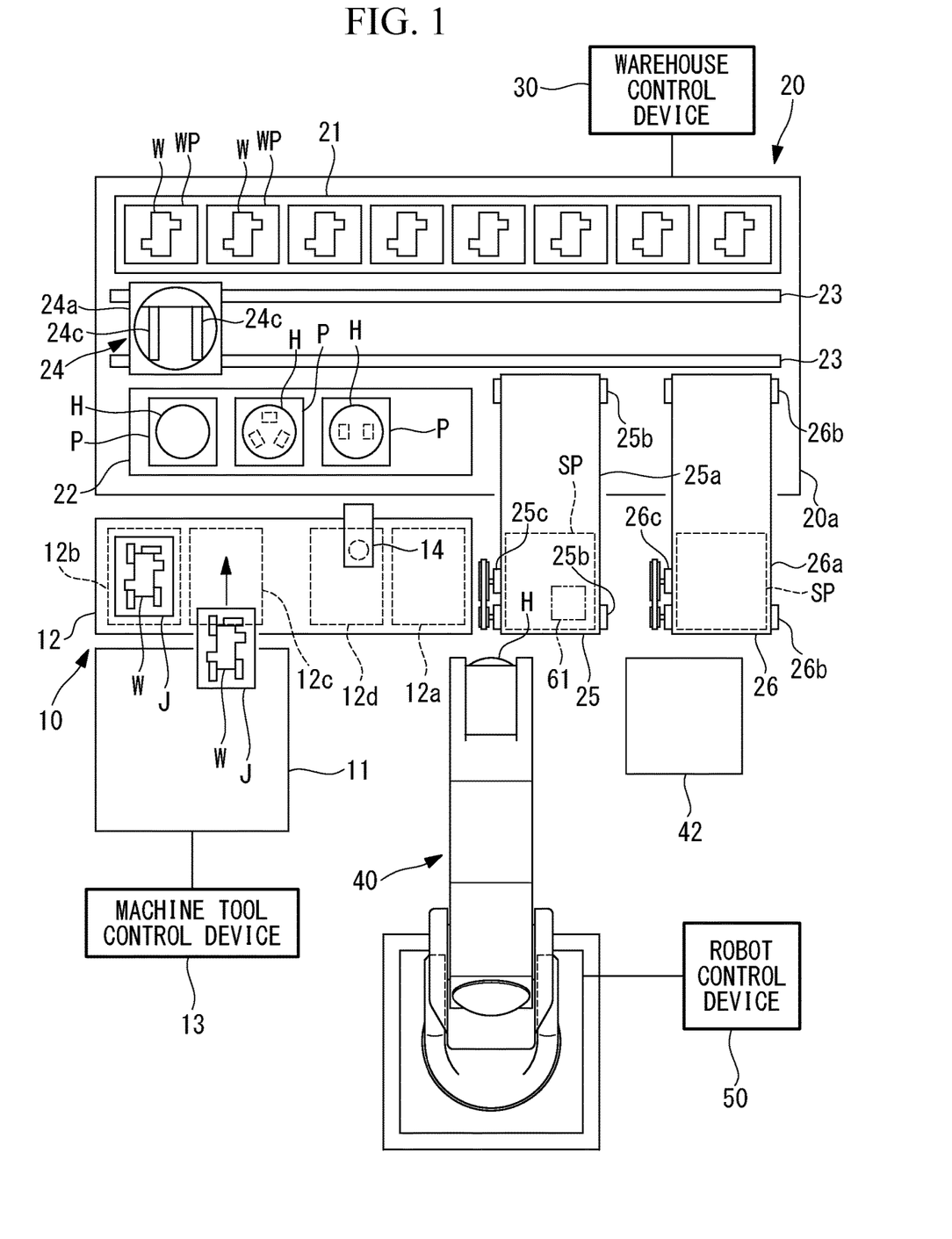
FIG. 1 is a schematic plan view of a machining system of a first embodiment of the present invention.

As shown in FIG. 1, this machining system includes: a machine tool 10 that machines a workpiece W; an automatic warehouse 20 that stores plural types of workpieces W, and moves a stored workpiece W to a supply position SP; a warehouse control device 30 that controls the automatic warehouse 20; a robot 40 that transfers the workpiece W moved to the supply position SP by the automatic warehouse 20, onto a jig J placed on a workpiece exchange conveyor 12 of the machine tool 10, in order for the workpiece W to be machined by the machine tool 10; and a robot control device 50.

The machine tool 10 includes: a machining unit 11, for example, having a well-known NC machine tool or the like that machines the workpiece W; the workpiece exchange conveyor 12 that supplies the jig J with the workpiece W attached thereto to the machining unit 11; and a machine tool control device 13 that controls the machining unit 11 and the workpiece exchange conveyor 12.

One end of the workpiece exchange conveyor 12 in a transfer direction is a workpiece mounting position 12a where the robot 40 supplies the workpiece W onto the jig J or the robot 40 picks up the machined workpiece W from the jig J. Further, the other end of the workpiece exchange conveyor 12 in the transfer direction is a standby position 12b, and a position nearer to the one end side than the standby position 12b in the transfer direction of the workpiece exchange conveyor 12 is a take-in/take-out position 12c where the jig J with the workpiece W is taken into or out from the machining unit 11. Further, there is a workpiece chucking position 12d between the take-in/take-out position 12c and the workpiece mounting position 12a in the transfer direction of the workpiece exchange conveyor 12. Alternatively, without separately providing the workpiece chucking position 12d, a chucking device 14 described later may be provided in the workpiece mounting position 12a, and the workpiece W may be chucked in the workpiece mounting position 12a.

When the workpiece W is placed on the jig J in the workpiece mounting position 12a by a hand H of the robot 40, the jig J with the workpiece W placed thereon is transferred to the workpiece chucking position 12d by the workpiece exchange conveyor 12.

In the workpiece chucking position 12d, the chucking device 14 rotates a fastening screw provided on the jig J to move a plurality of movable claws provided on the jig J, so that the workpiece W is chucked by the jig J. Alternatively, a single movable claw may be used.

The jig J chucking the workpiece W is transferred to the standby position 12b by the workpiece exchange conveyor 12. In this situation, a jig J chucking a machined workpiece W is taken out from the machining unit 11 and placed in the take-in/take-out position 12c, and as a result, the two jigs J are arranged on the workpiece exchange conveyor 12.

The two jigs J are transferred by the workpiece exchange conveyor 12, so that the jig J chucking the un-machined workpiece W is positioned at the take-in/take-out position 12c, and the jig J chucking the machined workpiece W is positioned at the workpiece chucking position 12d.

Then, the jig J arranged in the take-in/take-out position 12c is taken into the machining unit 11. In the workpiece chucking position 12d, the chucking device 14 rotates a fastening screw to move a plurality of movable claws provided on the jig J, so that the machined workpiece W is un-chucked from the jig J.

Subsequently, this jig J is moved to the workpiece mounting position 12a by the workpiece exchange conveyor 12, and the machined workpiece W in the workpiece mounting position 12a is transferred to a predetermined position by the hand H of the robot 40.

In a storage space 20a of the automatic warehouse 20, there are a workpiece storage region 21 in which a plurality of workpiece pallets WP are stored, each of which has a workpiece W placed thereon, and a fixture storage region 22 in which a plurality of pallets P are stored, each of which has a hand (robot fixture) H placed thereon. Further, in the storage space 20a of the automatic warehouse 20, there are provided a rail 23 arranged along the workpiece storage region 21 and fixture storage region 22, and a pickup device 24 that moves along the rail 23.

In the workpiece storage region 21, workpiece placing positions are provided in which respective workpiece pallets WP are placed, and the workpiece placing positions are given respective numbers such as W1, W2, . . . , Wn (not shown). Further, in the fixture storage region 22, fixture placing positions are provided in which respective pallets P are placed, and the fixture placing positions are given respective numbers such as T1, T2, . . . , Tn (not shown).

Figure 3:
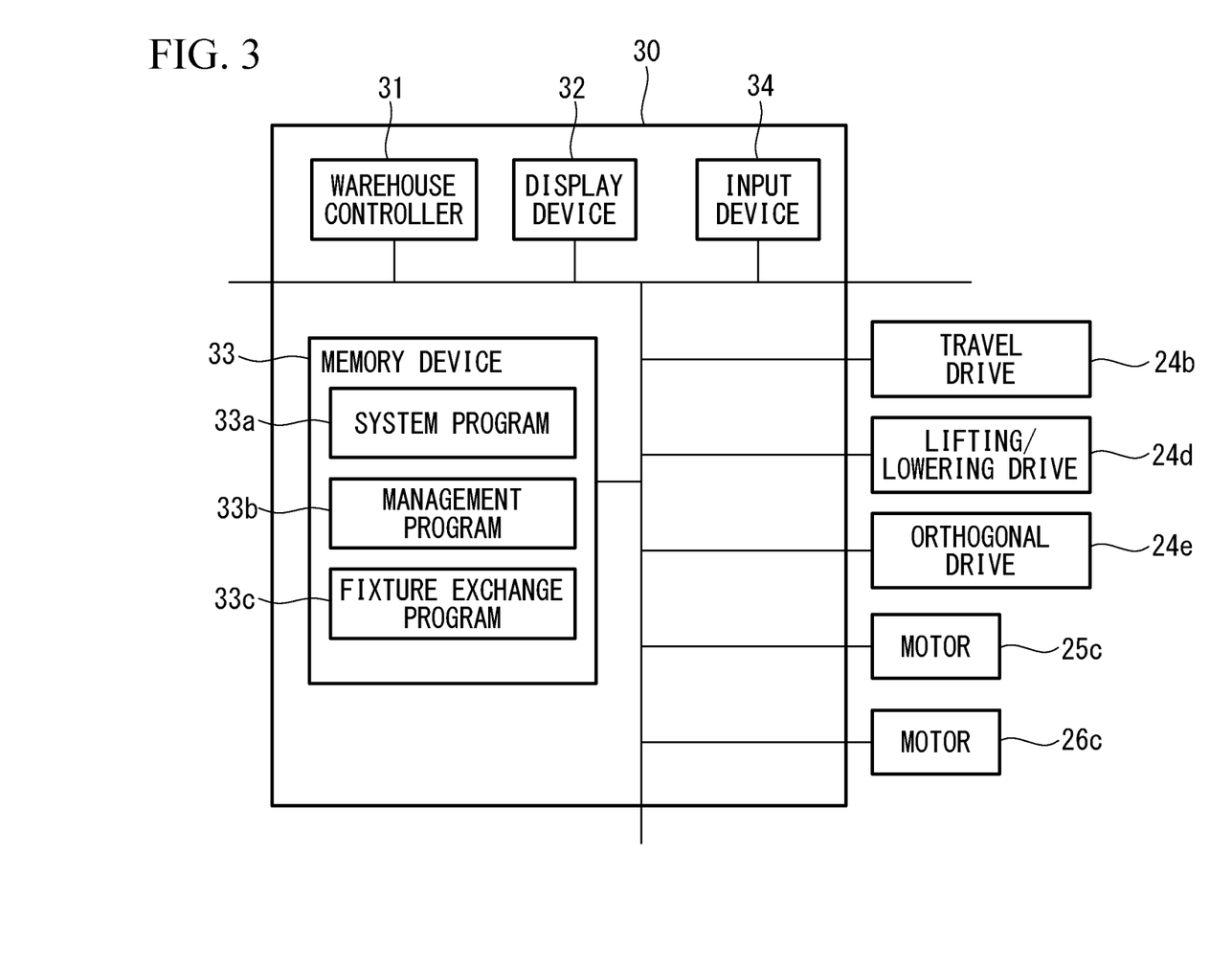
FIG. 3 is a block diagram of a warehouse control device of the machining system of the first embodiment.

The pickup device 24 includes: a device main body 24a; a travel drive 24b including a motor, wheels and the like that causes the device main body 24a to travel along the rail 23 (see FIG. 3); a pair of pickup claws 24c supported on the device main body 24a to be movable in an up-down direction; a lifting/lowering drive 24d including a motor, a ball screw and the like that lifts and lowers the pair of pickup claws 24c (see FIG. 3); and an orthogonal drive 24e including a motor, a ball screw and the like that moves the pair of pickup claws 24c in a direction orthogonal to the rail 23 (see FIG. 3).

Further, the automatic warehouse 20 includes a take-out conveyor (take-out device) 25 and a take-out conveyor (take-out device) 26 which extend from the inside to the outside of the storage space 20a. The take-out conveyors 25, 26 include belts 25a, 26a, rollers 25b, 26b which support chains or belts 25a, 26a, and motors 25c, 26c as driving devices which drive the belts 25a, 26a, respectively. A portion of each take-out conveyor 25, 26 outside the storage space 20a is the above described supply position SP.

The travel drive 24b, the lifting/lowering drive 24d, the orthogonal drive 24e, and the motors 25c, 26c are connected to the warehouse control device 30 and controlled by the warehouse control device 30.

As shown in FIG. 3, the warehouse control device 30, for example, includes: a warehouse controller 31 which has a CPU, a RAM, and the like; a display device 32; a memory device 33 which has a nonvolatile storage, a ROM, and the like; and an input device 34 which has a touch panel, an input key, and the like. The input device 34 may be configured to wirelessly communicate with the warehouse control device 30.

A system program 33a is stored in the memory device 33, and the system program 33a is responsible for the basic function of the warehouse control device 30. Further, a management program 33b is stored in the memory device 33, and the management program 33b manages information, such as types of workpieces W stored in the automatic warehouse 20, types of robot fixtures such as hands H stored in the automatic warehouse 20, and the numbers thereof and placed positions thereof (workpiece placing positions W1, W2, Wn, and fixture placing positions T1, T2, . . . , Tn). Then, based on a request from a higher system such as a production management system, the management program 33b supplies workpiece pallets WP with workpieces W placed thereon to the supply position SP in sequence using the travel drive 24b, the lifting/lowering drive 24d, the orthogonal drive 24e, and the take-out conveyors 25, 26.

Figure 2:
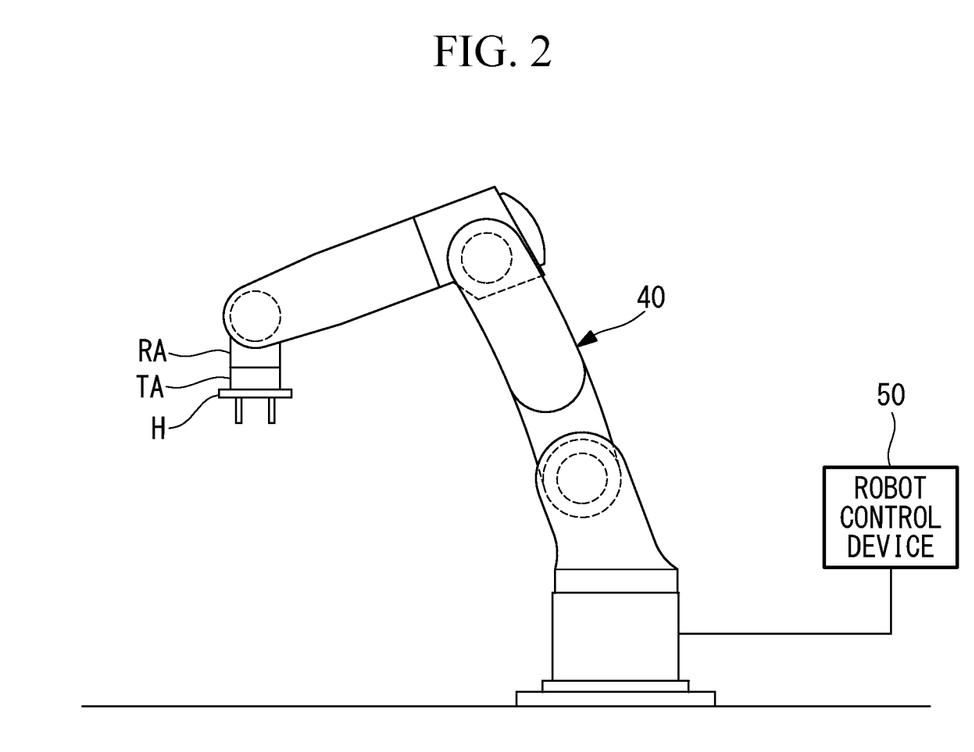
FIG. 2 is a side view of a robot of the machining system of the first embodiment.

As shown in FIG. 2, the robot 40 includes a plurality of arm members and a plurality of joints, and further includes a plurality of servo motors 41 (see FIG. 4) which actuate respective joints. Various types of servo motors such as a rotary motor or a direct acting motor may be used as each servo motor 41. Each servo motor 41 incorporates therein an actuating position detecting device such as an encoder that detects its actuating position, and a detected value of the actuating position detecting device is sent to the robot control device 50. Further, a robot adapter RA of a tool changer is fixed to the tip of the robot 40, and a tool adapter TA fixed to the hand (robot fixture) H is attached to the robot adapter RA. The robot adaptor RA is adapted to perform attachment and detachment of the tool adapter TA by a motor, a fixing cam and the like provided inside the robot adapter RA.

Figure 4:
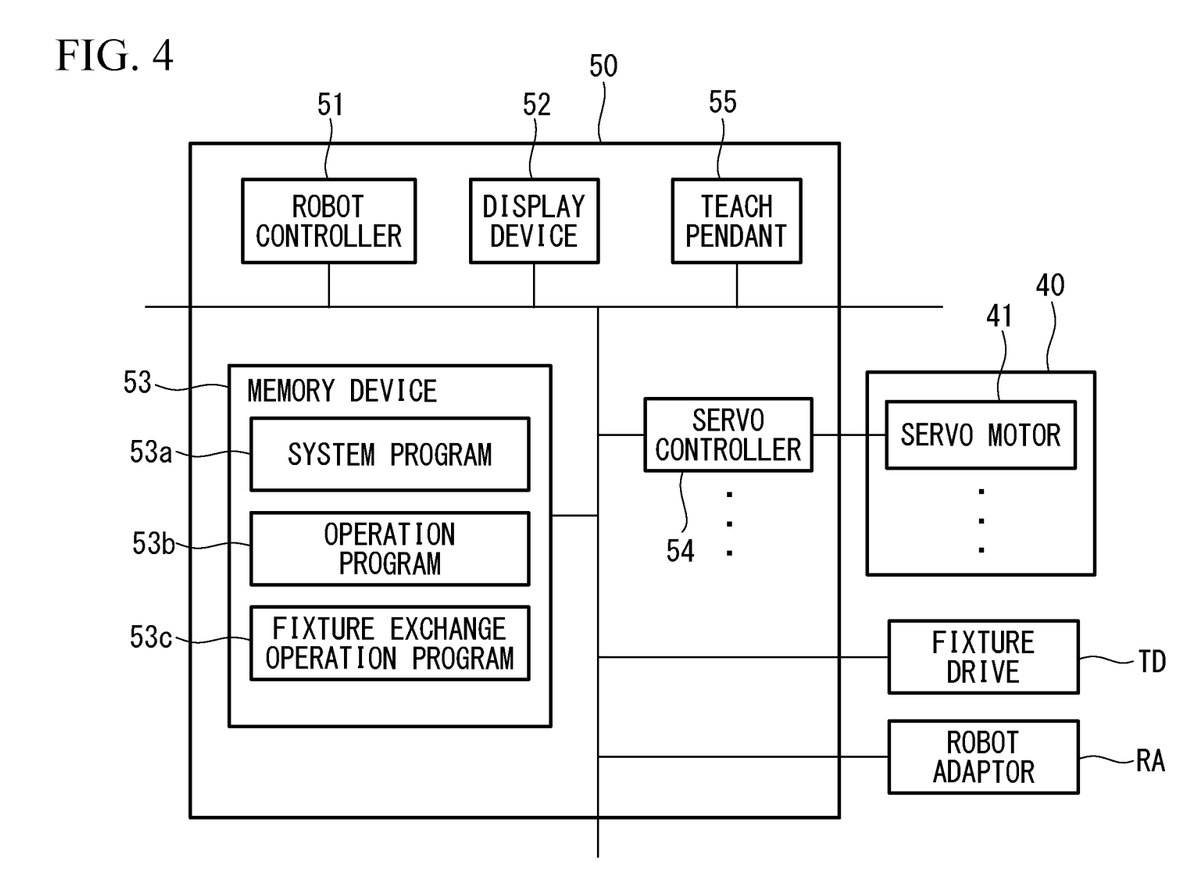
FIG. 4 is a block diagram of a robot control device in the machining system of the first embodiment.

As shown in FIG. 4, the robot control device 50, for example, includes: a robot controller 51 which has a CPU, a RAM, and the like; a display device 52; a memory device 53 which has a nonvolatile storage, a ROM, and the like; a plurality of servo controllers 54 provided respectively corresponding to the servo motors 41 of the robot 40; and a teach pendant 55 which is connected to the robot control device 50 and can be carried by an operator. The teach pendant 55 may be configured to wirelessly communicate with the robot control device 50.

A system program 53a is stored in the memory device 53, and the system program 53a is responsible for the basic function of the robot control device 50. Further, at least one operation program 53b is stored in the memory device 53.

The robot controller 51 is operated by the system program 53a. When the workpiece W in the supply position SP is to be moved onto the jig J placed in the workpiece mounting position 12a of the workpiece exchange conveyor 12 of the machine tool 10, the robot controller 51 reads out the operation program 53b stored in the memory device 53 and temporarily stores the operation program 53b in the RAM.

Then, the robot controller 51 sends a control signal to each servo controller 54 according to the read operation program 53b, thereby controlling a servo amplifier of each servo motor 41 of the robot 40. Further, the robot controller 51 also sends a control signal to a fixture drive TD having a motor and the like for driving a robot fixture such as a hand H, and also sends a control signal to the robot adapter RA. The hand H corresponds to the type of workpiece W, and the operation program 53b may be prepared corresponding to the type of workpiece W.

A fixture exchange operation program 53c is also stored in the memory device 53, and the fixture exchange operation program 53c is used for exchanging robot fixtures such as hands H attached to the tip of the robot 40. An operation of the warehouse controller 31 based on the fixture exchange program 33c and an operation of the robot controller 51 based on the fixture exchange operation program 53c will be described below with reference to the flowchart of FIG. 5.

Figure 5:
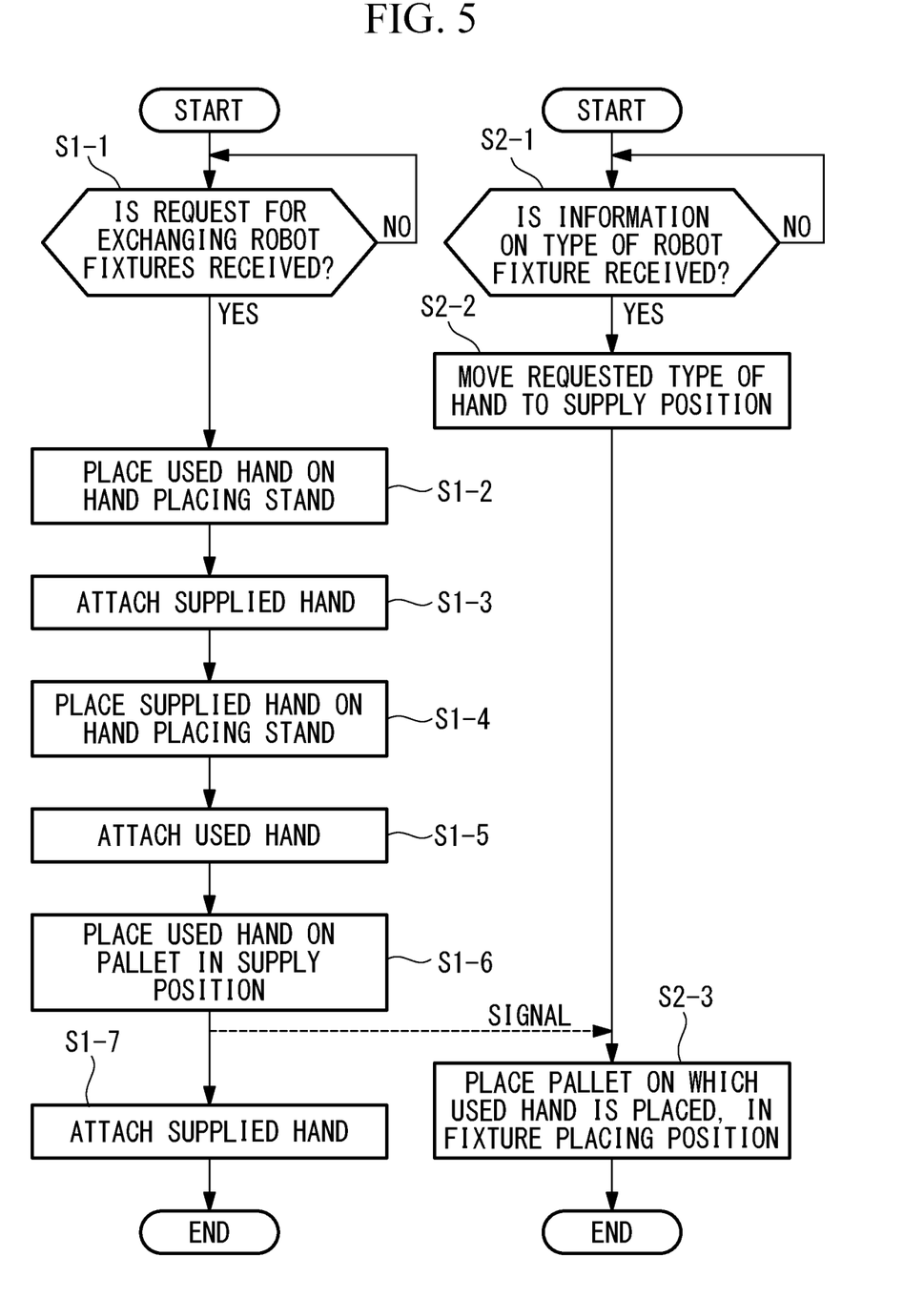
FIG. 5 is a flowchart illustrating an example of control by a warehouse controller and a robot controller of the first embodiment.

The robot controller 51 receives a request for exchange of robot fixtures such as hands H, from a higher system such as a production management system (step S1-1). At this time, the warehouse controller 31 receives information on the type of a robot fixture such as a hand H to be supplied to the supply position SP, from the higher system such as the production management system (step S2-1), and controls the travel drive 24b, the lifting/lowering drive 24d, the orthogonal drive 24e, and the take-out conveyor 25 so that a pallet P with the above type of hand H placed thereon is moved to the supply position SP of the take-out conveyor 25 (step S2-2).

At this time, the warehouse controller 31 can obtain the position of the pallet P with the hand H of the type received in step S2-1 placed thereon (fixture placing positions T1, T2, . . . , Tn), referring to information managed by the management program 33b.

Subsequently, the robot controller 51 sends a control signal to each servo controller 54 and the robot adaptor RA to control each servo motor 41 and the robot adaptor RA so that the used hand H is placed, for example, on a hand placing stand 42 (step S1-2).

Next, the robot controller 51 controls each servo motor 41 and the robot adaptor RA so that the hand H supplied to the supply position SP of the take-out conveyor 25 is attached to the robot adapter RA at the tip of the robot 40 (step S1-3).

At this time, if the hand H can be reliably put on a predetermined position and in posture within the supply position SP, the hand H can be attached to the robot adapter RA only by arranging the robot adapter RA in a corresponding position and posture. On the other hand, it is also possible that using a visual sensor 61 such as a camera as shown in FIG. 1, the robot controller 51 performs image processing on an image obtained by the visual sensor 61, to detect the position and posture of the hand H using the processed image, and the robot controller 51 controls the position and posture of the robot adapter RA using the detected position and posture of the hand H.

Subsequently, the robot controller 51 controls each servo motor 41 and the robot adaptor RA so that the hand H attached in the supply position SP is placed, for example, on the hand placing stand 42 (step S1-4). Further, each servo motor 41 and the robot adaptor RA are controlled so that the used hand H is attached to the robot adapter RA at the tip of the robot 40 (step S1-5).

Then, the robot controller 51 controls each servo motor 41 and the robot adaptor RA so that the used hand H is placed on the pallet P put on the supply position SP of the take-out conveyor 25 (step S1-6). At this time, a signal indicating that step S1-6 is completed is sent from the robot controller to the warehouse controller 31. Further, the robot controller 51 controls each servo motor 41 and the robot adaptor RA so that the supplied hand H is attached to the robot adaptor RA at the tip of the robot 40 (step S1-7).

On the other hand, the warehouse controller 31 controls the travel drive 24b, the lifting/lowering drive 24d, the orthogonal drive 24e, and the take-out conveyor 25 so that the pallet P with the used hand H placed thereon is placed in any of the fixture placing positions T1, T2, . . . , Tn of the fixture storage region 22 in the automatic warehouse 20 (step S2-3). The number indicating the fixture placing position in which the pallet P having the used hand H should be placed and the type of this hand H are managed by the management program 33b.

According to the present embodiment, hands H, which are robot fixtures, are stored in the automatic warehouse 20, and a hand H corresponding to a request received by the warehouse control device 30 is moved to the supply position SP of the automatic warehouse 20. Accordingly, there is no need to place many hands H around the robot 40, and space for placing hands H around the robot 40 can be reduced or eliminated.

Further, since the robot 40 is controlled to attach thereto a hand H moved to the supply position SP of the automatic warehouse 20, there is no operation by an operator for attaching the hand H to the robot 40, and operation efficiency can be improved.

In the present embodiment, a used hand H and a supplied hand H are illustrated to be placed once on the hand placing stand 42 in steps S1-2 to S1-7. In contrast, in a case where the pallet P has a space in which a supplied hand H is placed and a space in which a used hand H is placed, the following steps can be performed instead of steps S1-2 to S1-7. Specifically, as step S1-2', each servo motor 41 and the robot adaptor RA can be controlled so that the used hand H is placed on the pallet P on which the supplied hand H is placed and which is put on the supply position SP, and as step S1-3', each servo motor 41 and the robot adaptor RA can be controlled so that the supplied hand H on the pallet P is attached to the robot adapter RA at the tip of the robot 40.

Since the pallet is configured so that, in a state where the supplied hand H is placed thereon, another hand H can be placed thereon as described above, operation for exchanging hands H can be performed easily in a shorter time. Further, the space such as the hand placing stand 42 required for exchanging hands H can be reduced, and this is advantageous in achieving space saving of the machining system.

Further, it is also possible that while a pallet P on which a supplied hand H is placed is put on the supply position SP of the take-out conveyor 25, a pallet P for placing a used pallet P thereon is put on the supply position SP of the take-out conveyor 26. Also in this configuration, operation for exchanging hands H can be performed easily in a shorter time, and the space such as the hand placing stand 42 required for exchanging hands H can be reduced.

Further, in the present embodiment, the automatic warehouse 20 includes a plurality of take-out conveyors 25, 26 that transfer a workpiece W and/or a hand H to a plurality of supply positions SP. Therefore, for example, while the take-out conveyor 26 continues to supply a workpiece W, the take-out conveyor 25 can supply a hand H, and this is advantageous in shortening the time for exchanging hands H.

Further, in the present embodiment, the take-out conveyors 25, 26 are configured to perform taking-out toward a direction from the storage space 20a to the provided machine tool 10 and robot 40. On the other hand, in a case where another machine tool and another robot are arranged around the storage space 20a, another take-out conveyor can be provided which performs taking-out in a direction toward them. In this way, by arranging take-out conveyors according to the installation positions and numbers of machine tools and robots, efficiency improvement and space saving in each machining area can be achieved.

Further, in the present embodiment, the visual sensor 61 that captures an image of a hand H supplied to the supply position SP is provided, and the robot control device 50 controls the robot 40 to attach thereto the hand H supplied to the supply position SP, using a position and a posture of the hand H detected based on the image captured by the visual sensor 61. Therefore, even if the position and the posture of the hand H supplied to the supply position SP are not fixed, the hand H can be surely attached to the tip of the robot 40.

In the present embodiment, the hand H is illustrated as being used as a robot fixture. However, a hand claw, a nut runner, or a cleaning tool may be stored in the automatic warehouse 20 as a robot fixture, and these robot fixtures may be exchanged in a similar way to hands H.

Figure 6:
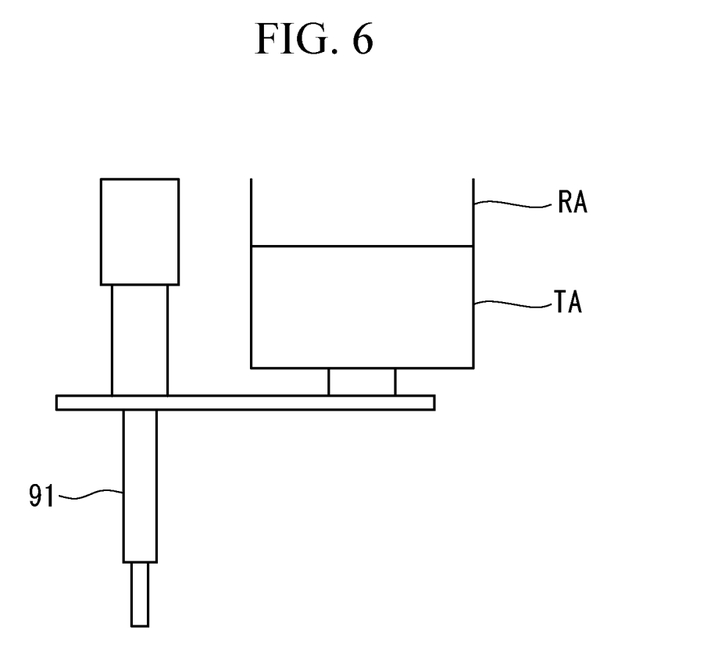
FIG. 6 is a side view of a main part of a robot according to a first modification of the first embodiment.

For example, as shown in FIG. 6, a nut runner 91 fixed to the tool adapter TA of the tool changer is attached to the robot 40 as a robot fixture when the tool adapter TA is attached to the robot adapter RA at the tip of the robot 40. The nut runner 91 is intended to be driven by a motor or the like to tighten a bolt, a nut and the like.

Figure 7:
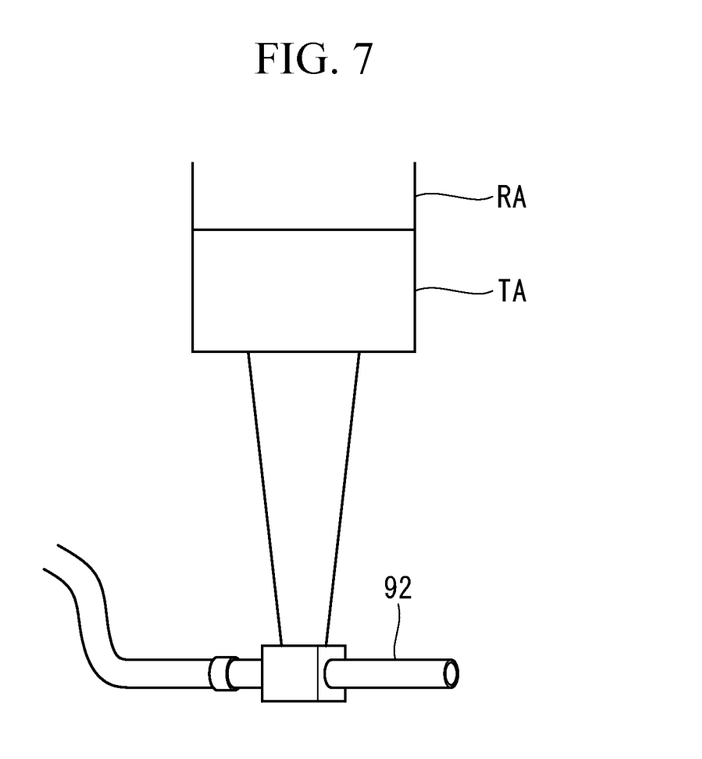
FIG. 7 is a side view of a main part of a robot according to a second modification of the first embodiment.

Further, as shown in FIG. 7, a suction nozzle 92 as a cleaning tool fixed to the tool adapter TA of the tool changer is attached to the robot 40 as a robot fixture when the tool adapter TA is attached to the robot adapter RA at the tip of the robot 40.

In the case of a hand claw (a claw member for a hand H), the hand claw is supplied to the supply position SP while being placed on the pallet P. It is also possible that a used claw member for the hand H attached to the robot 40 is arranged above an empty space of the pallet P, and the claw member is removed by driving of a motor or the like included in the main body of the hand H, and then, the main body of the hand H is arranged above a supplied claw member, and the supplied claw member is attached by driving of the motor or the like included in the main body of the hand H.

Further, in the present embodiment, jigs J to be used for machining by the machine tool 10 can also be stored in the automatic warehouse 20. In this case, based on a request from a higher system such as a production management system, the automatic warehouse 20 controlled by the warehouse controller 31 supplies a jig J corresponding to the request and a hand H to be used for exchanging the jig J to the supply positions SP of the take-out conveyors 25, 26, and the robot 40 controlled by the robot controller 51 attaches the supplied hand H thereto, and places the supplied jig J on the workpiece exchange conveyor 12 of the machine tool 10 using the supplied hand H. An operation of the warehouse controller 31 based on the fixture exchange program 33*c* and an operation of the robot controller 51 based on the fixture exchange operation program 53*c* in this case will be described below with reference to the flowchart of FIG. 8.

Figure 8:
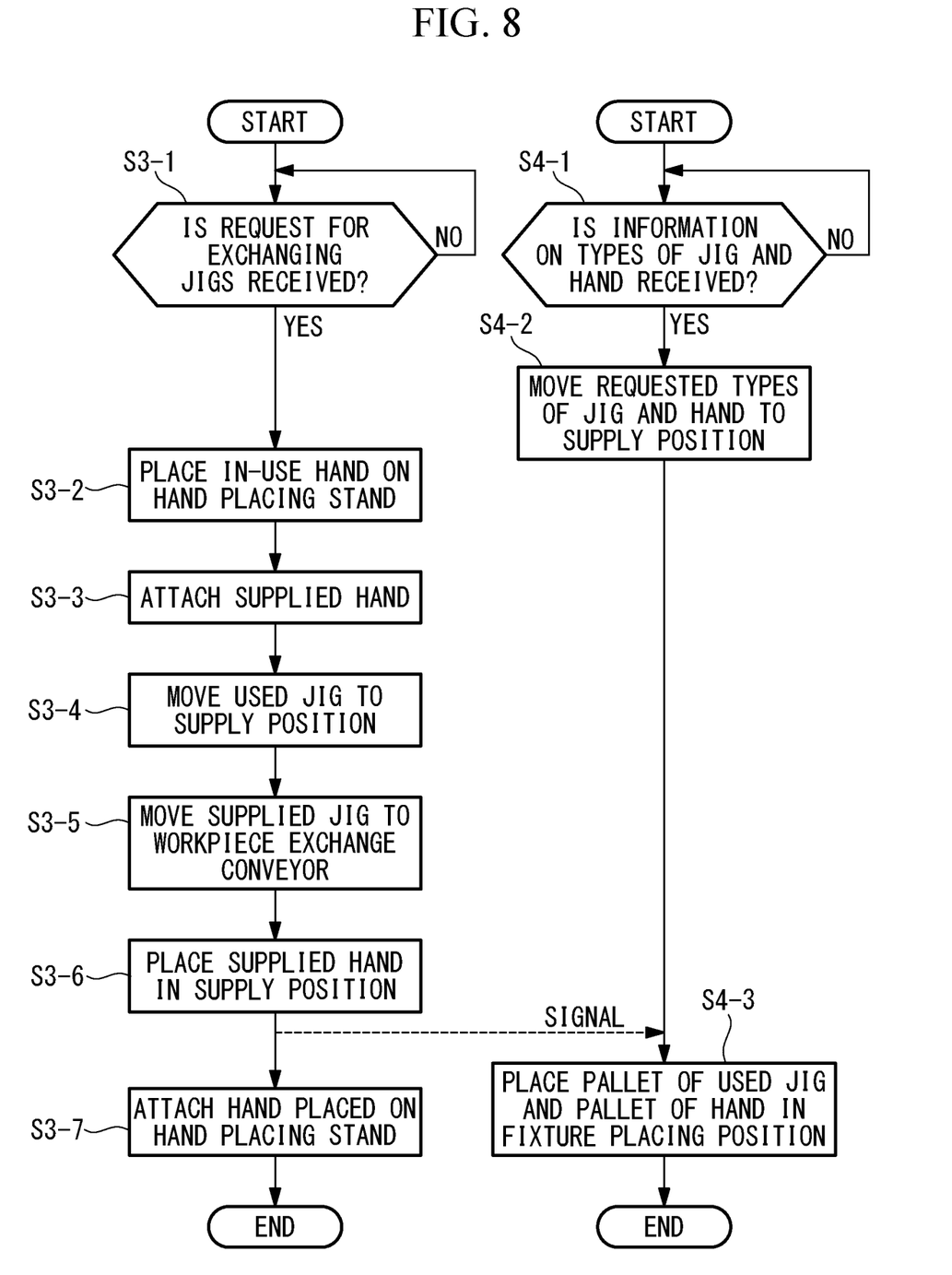
FIG. 8 is a flowchart illustrating an example of control by a warehouse controller and a robot controller in a third modification of the first embodiment.

The robot controller 51 receives a request for exchange of jigs J from a higher system such as a production management system (step S3-1). At this time, the warehouse controller 31 receives information on the type of a jig J to be supplied to the supply position SP and the type of a hand H corresponding to the type of the jig J, from the higher system such as the production management system (step S4-1), and controls the travel drive 24*b*, the lifting/lowering drive 24*d*, the orthogonal drive 24*e*, and the take-out conveyors 25, 26 so that a pallet P with the above type of jig J placed thereon is moved to, for example, the supply position SP of the take-out conveyor 26, and so that a pallet P with the above type of hand H placed thereon is moved to, for example, the supply position SP of the take-out conveyor 25 (step S4-2).

Subsequently, the robot controller 51 sends a control signal to each servo controller 54 and the robot adaptor RA to control each servo motor 41 and the robot adaptor RA so that an in-use hand H is placed on, for example, the hand placing stand 42 (step S3-2).

Next, the robot controller 51 controls each servo motor 41 and the robot adaptor RA so that the hand H supplied to the supply position SP of the take-out conveyor 25 is attached to the robot adapter RA at the tip of the robot 40 (step S3-3).

Subsequently, the robot controller 51 controls each servo motor 41 and the fixture drive TD so that a used jig J placed in the workpiece mounting position 12*a* of the workpiece exchange conveyor 12 is moved to the supply position SP of the take-out conveyor 25 (step S3-4). At this time, it is preferable that the pallet P for the jig J has been prepared in the supply position SP of the take-out conveyor 25 by the automatic warehouse 20.

Subsequently, the robot controller 51 controls each servo motor 41 and the fixture drive TD so that the jig J supplied to the supply position SP of the take-out conveyor 26 is moved to the workpiece mounting position 12*a* of the workpiece exchange conveyor 12 (step S3-5).

Next, the robot controller 51 controls each servo motor 41 and the robot adaptor RA so that the attached hand H is placed on the supply position SP of the take-out conveyor 25 (step S3-6). At this time, it is preferable that the pallet P for the hand H has been prepared in the supply position SP of the take-out conveyor 25 by the automatic warehouse 20. Further, a signal indicating that step S3-6 is completed is sent from the robot controller 51 to the warehouse controller 31.

Subsequently, the robot controller 51 controls each servo motor 41 and the robot adaptor RA so that the hand H placed on the hand placing stand 42 is attached to the robot adapter RA at the tip of the robot 40 (step S3-7).

On the other hand, the warehouse controller 31 controls the travel drive 24*b*, the lifting/lowering drive 24*d*, the orthogonal drive 24*e*, and the take-out conveyors 25, 26 so that the pallets P on which the used jig J and the hand H used for exchange of jigs J are placed in any of the fixture placing positions T1, T2, . . . , Tn of the fixture storage region 22 of the automatic warehouse 20 (step S4-3). The number indicating the fixture placing position in which the pallet P having the used jig J is placed and the types of the jig J and the hand H are managed by the management program 33*b*.

In this configuration, jigs J to be used for machining by the machine tool 10 are stored in the automatic warehouse 20, and a jig J corresponding to a request received by the warehouse control device 30 is supplied to the supply position SP of the automatic warehouse 20. Further, a hand H to be used for exchanging the jig J is also supplied. Accordingly, there is no need to place many jigs J around the robot 40 and the machine tool 10, and operation for exchanging jigs by an operator can be reduced or eliminated, so that efficiency improvement and space saving of the machining system can be achieved.

Many of jigs J used for machining by the machine tool 10 weigh several ten kg or several hundred kg, and their shapes vary depending on the type of workpiece W and the machining to be performed. Therefore, by supplying a hand H corresponding to a jig J from the automatic warehouse 20, the jig J can be safely and reliably moved.

Further, even though a hand H is heavy corresponding to the size and weight of a jig J, the robot 40 is controlled to attach thereto a hand H moved to the supply position SP of the automatic warehouse 20, and this is advantageous in improving the safety and efficiency of the operation for attaching the hand H to the robot 40. Furthermore, since a hand H corresponding to a jig J that weighs several ten kg to several hundred kg is automatically attached to the robot 40, the heavy jig can be safely and reliably transferred to a predetermined position.

In the present embodiment, a supplied jig J and a used jig J are illustrated to be transferred by the same hand H in step S3-2 to S3-6. However, for transferring the used jig J, a hand H corresponding to the used jig J may be attached to the robot 40.

A machining system according to a second embodiment of the present invention will be described below with reference to the drawings.

Figure 9:
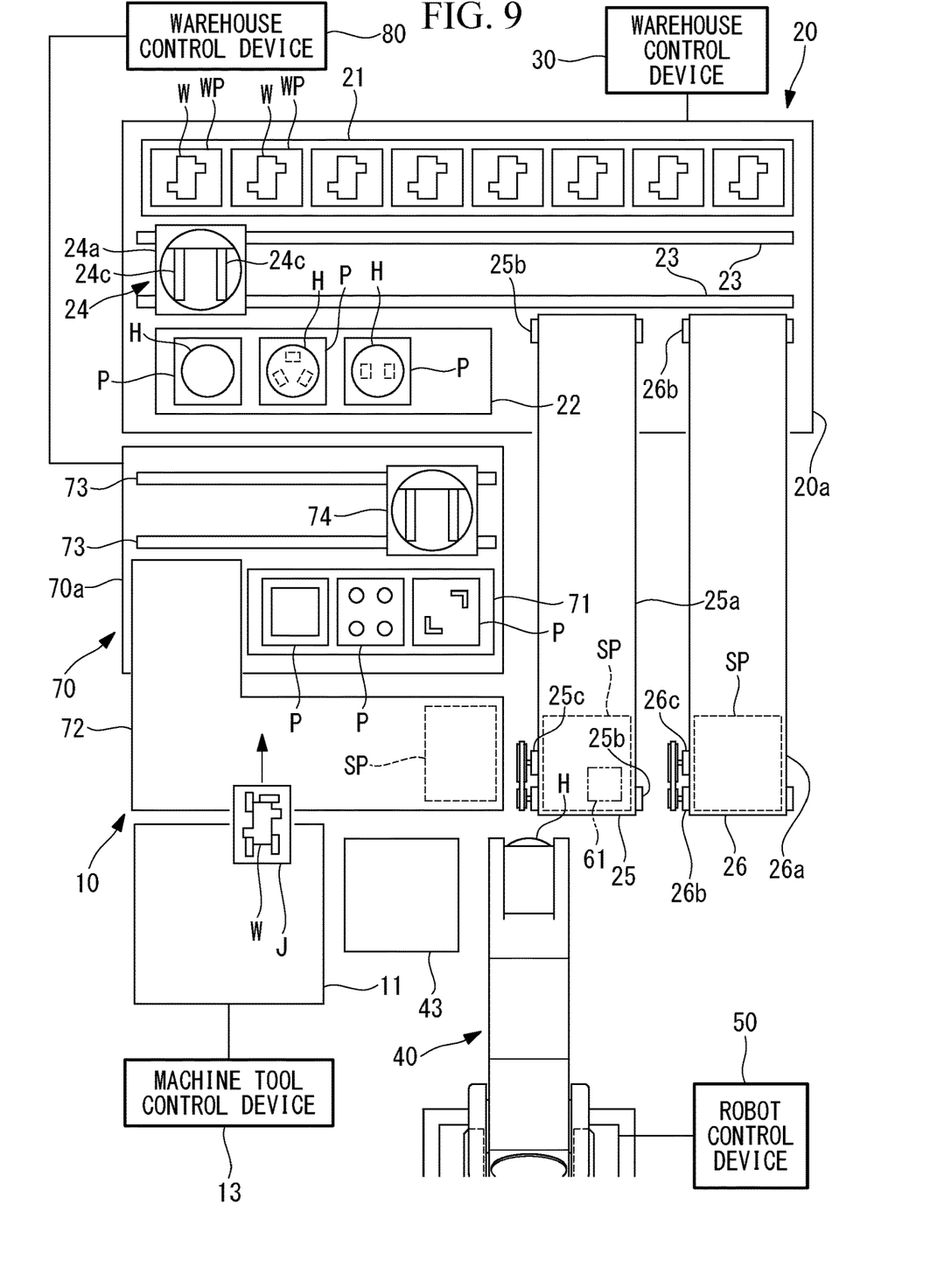
FIG. 9 is a schematic plan view of a machining system of a second embodiment of the present invention.

As shown in FIG. 9, in the machining system according to the second embodiment, an automatic warehouse 70 for jigs is provided in addition to the automatic warehouse 20 of the first embodiment.

In the second embodiment, configurations similar to or the same as those of the first embodiment will be given the same reference characters, and a description thereof is omitted.

This machining system is provided with the automatic warehouse 70 for jigs near the machining unit 11 of the machine tool 10, and also with a warehouse control device 80 that controls the automatic warehouse 70 for jigs.

In a storage space 70a of the automatic warehouse 70 for jigs, there is a jig storage region 71 in which a plurality of pallets P are stored, and on each of the pallets P, a part of a jig J (including a base part) or an assembled jig J is placed. Further, in the storage space 70a of the automatic warehouse 70 for jigs, there are provided a rail 73 arranged along the jig storage region 71, and a pickup device 74 that moves along the rail 73. Further, the automatic warehouse 70 for jigs is provided with a take-out conveyor 72 which extends from the inside to the outside of the storage space 70a.

The pickup device 74 has a similar configuration to the pickup device 24 of the first embodiment, and configured to place a pallet P placed in the jig storage region 71 onto the take-out conveyor 72, and place the pallet P on the take-out conveyor 72 into the jig storage region 71. The pickup device 74 and the take-out conveyor 72 may be configured to directly transfer jigs J and parts thereof.

In the jig storage region 71, jig placing positions are provided in which respective pallets P are placed, and the jig placing positions are given respective numbers such as J1, J2, . . . , Jn (not shown).

Also, the warehouse control device 80 has a similar configuration to the warehouse control device 30 of the first embodiment. One example of an operation of the warehouse control device 80 based on a fixture exchange program stored in the warehouse control device 80 and an operation of the robot controller 51 based on the fixture exchange operation program 53c will be described below with reference to the flowchart of FIG. 10.

Figure 10:
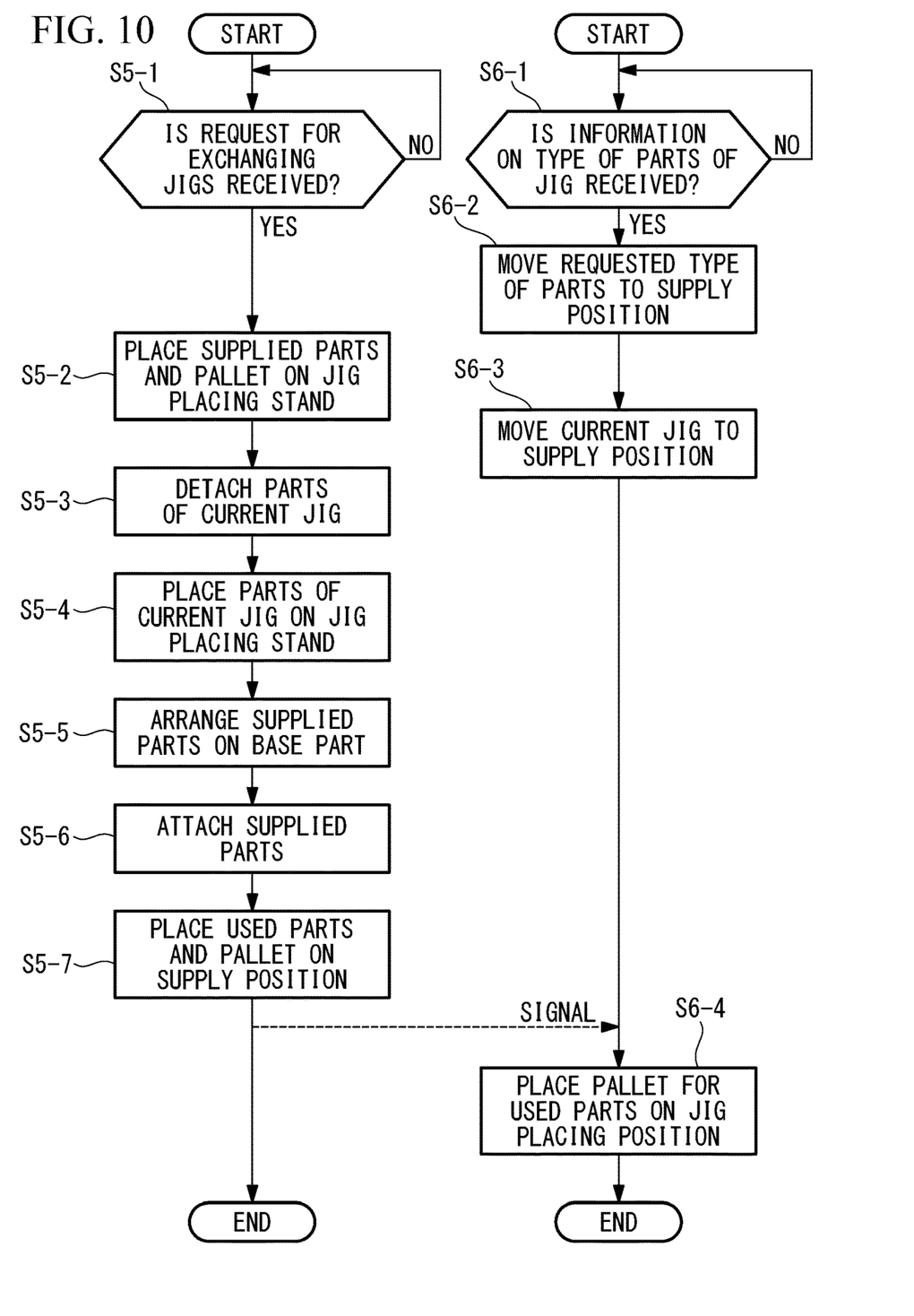
FIG. 10 is a flowchart of a robot control device in the machining system of the second embodiment.

The robot controller 51 receives a request for exchange of jigs J, from a higher system such as a production management system (step S5-1). At this time, a controller of the warehouse control device 80 receives information on the type of a part of a jig J to be supplied to the supply position SP on the take-out conveyor 72, from the higher system such as the production management system (step S6-1), and controls the pickup device 74 and the take-out conveyor 72 so that a pallet P with the above type of a part of jig J (a plurality of parts in the present embodiment) placed thereon is moved to the supply position SP of the take-out conveyor 72 (step S6-2). The current jig has been contained in the machining unit 11.

At this time, it is preferable that a hand H for jig exchange supplied from the automatic warehouse 20 has been attached to the robot 40.

Subsequently, the robot controller 51 controls each servo controller 54 and the fixture drive TD so that the plurality of parts of the jig J and the pallet P supplied to the supply position SP are placed on a jig placing stand 43 (step S5-2).

Next, the controller of the warehouse control device 80 controls the take-out conveyor 72 so that the current jig J contained in the machining unit 11 is moved to, for example, the supply position SP (step S6-3).

Subsequently, the robot controller 51 controls each servo controller 54 and the fixture drive TD so that a plurality of parts of the current jig J placed in the supply position SP are detached from its base part (step S5-3). For example, in a case where a mechanism for gripping and rotating a bolt has been attached to the hand H for jig exchange, the plurality of parts of the current jig J are detached from the base part by this mechanism.

Next, the robot controller 51 controls each servo controller 54 and the fixture drive TD so that the plurality of parts on the base part placed in the supply position SP are placed on the jig placing stand 43 (step S5-4).

Further, the robot controller 51 controls the each servo controller 54 and the fixture drive TD so that the plurality of supplied parts placed on the jig placing stand 43 are arranged in a predetermined position on the base part (step S5-5).

Subsequently, the robot controller 51 controls each servo controller 54 and the fixture drive TD so that the plurality of parts are attached to the base part placed in the supply position SP (step S5-6). For example, the plurality of parts are attached to the base part by the mechanism for gripping and rotating a bolt of the hand H for jig exchange.

Next, the robot controller 51 controls each servo controller 54 and the fixture drive TD so that the used part and the pallet P placed on the jig placing stand 43 are placed in the supply position SP of the take-out conveyor 72 (step S5-7). At this time, the above described control is performed so that the pallet P is first placed in the supply position SP and the used part is then placed on the pallet P. Further, a signal indicating that step S5-7 is completed is sent from the robot controller 51 to the warehouse control device 80.

Then, the pickup device 74 and the take-out conveyor 72 are controlled so that the pallet P on which the plurality of parts of the used jig J is placed on any of the jig placing positions J1, J2, . . . , Jn of the jig storage region 71 of the automatic warehouse 70 for jigs (step S6-4). The number indicating the jig placing position in which the pallet P having the plurality of used parts are placed and the types of the plurality of parts are managed by a management program of the automatic warehouse 70 as in the first embodiment.

Also in this configuration, jigs J and parts thereof (including base parts) to be used for machining by the machine tool 10 are stored in the automatic warehouse 70 for jigs, and parts of a jig J corresponding to a request received by the warehouse control device 80 is supplied to the supply position SP on the take-out conveyor 72 of the automatic warehouse 70 for jigs. Accordingly, there is no need to place many jigs J around the robot 40 and the machine tool 10, and operation for exchanging jigs by an operator can be reduced or eliminated, so that efficiency improvement and space saving of the machining system can be achieved.

Although the above described example illustrates that parts of a jig J are exchanged, the jig J itself may be exchanged. Further, a configuration may be employed in which hands H and the like are stored in the automatic warehouse 70 for jigs, and a hand H based on a request from a higher system is supplied to the supply position SP of the take-out conveyor 72 of the automatic warehouse 70 for jigs.

The following aspects of the present invention are derived from the aforementioned disclosure.

A machining system according to an aspect of the present invention includes: an automatic warehouse that stores workpieces, and moves the stored workpieces to a supply position; a warehouse control device that receives a workpiece type to be moved to the supply position, and controls the automatic warehouse to move the workpiece corresponding to the received workpiece type to the supply position; a machine tool that machines the workpieces; a robot that transfers the workpieces, which are moved to the supply position by the automatic warehouse, to a machine tool side, in order for the workpiece to be machined by the machine tool; a control device that controls the robot, wherein the automatic warehouse stores a robot fixture which is a tool, a hand, or a hand claw to be attached to a tip of the robot, the warehouse control device receives a request for a robot fixture to be moved to the supply position, and controls the automatic warehouse to move the robot fixture corresponding to the received request to the supply position, and the control device controls the robot to attach thereto the robot fixture supplied to the supply position.

In the aspect, robot fixtures are stored in the automatic warehouse, and a robot fixture corresponding to a request received by the warehouse control device is moved to the supply position of the automatic warehouse. Accordingly, there is no need to place many robot fixtures around the robot, and space for placing robot fixtures around the robot can be reduced or eliminated.

Further, since the robot is controlled to attach thereto a robot fixture moved to the supply position of the automatic warehouse, there is no operation by an operator for attaching the robot fixture to the robot, and operation efficiency can be improved.

In the above aspect, a jig used for the machining by the machine tool may be stored in the automatic warehouse, the warehouse control device may receive a request for a jig to be moved to the supply position, and control the automatic warehouse to move the jig corresponding to the received request and a hand corresponding to the jig to the supply position, and the control device may control the robot to attach thereto the hand moved to the supply position and to transfer the jig moved to the supply position to the machine tool side by the hand.

Here, jigs used for machining by a machine tool are for holding, e.g., a workpiece with a complicated shape or an easily deformable workpiece so as to prevent the workpiece from being deformed by force applied during machining. Accordingly, there are a plurality of jigs corresponding to types of workpieces, and each jig is relatively large and heavy, and many of them weigh several ten kg to several hundred kg. However, in the above described configuration, it is not necessary to place a plurality of big jigs corresponding to the types of workpieces around the machine tool, and space for placing jigs in the machining system can be reduced or eliminated.

Further, even though a hand is heavy corresponding to the size and weight of a jig, the robot is controlled to attach thereto a hand moved to the supply position of the automatic warehouse, and this is advantageous in improving the safety and efficiency of the operation for attaching the hand to the robot. Furthermore, since a hand corresponding to a jig that weighs several ten kg to several hundred kg is automatically attached to the robot, the heavy jig can be safely and reliably transferred to a predetermined position.

In the above aspect, preferably, the automatic warehouse includes a plurality of take-out devices, each of which takes out the workpiece and/or the robot fixture to a corresponding one of a plurality of the supply positions.

In this configuration, for example, while some of take-out devices continue to supply workpieces, the other take-out device can supply a robot fixture, and this is advantageous in shortening the time for exchanging robot fixtures.

Further, in a case where another machine tool and another robot are arranged around the automatic warehouse, some of the take-out devices may be arranged in a direction toward them. In this way, by arranging a plurality of take-out devices according to the numbers and the positions of machine tools and robots, space saving around each machine tool can be achieved.

In the above aspect, preferably, a visual sensor that captures an image of the robot fixture supplied to the supply position is provided, wherein the control device controls the robot to attach thereto the robot fixture supplied to the supply position, using a position and posture of the robot fixture detected based on the image captured by the visual sensor.

In this configuration, even if the position and the posture of the robot fixture supplied to the supply position are not fixed, the robot fixture can be surely attached to the tip of the robot.

In the above aspect, the tool may be a nut runner or a cleaning tool.

In the above aspect, preferably, the robot fixture is configured to be supplied to the supply position in a state where the robot fixture is put on a pallet, the pallet is configured so that, in a state where the supplied robot fixture is placed on the pallet, another robot fixture can be placed on the pallet.

In this configuration, operation for exchanging robot fixtures can be performed easily in a shorter time. Further, since space for temporarily placing a robot fixture is not needed, it is advantageous in achieving space saving of the machining system.

According to the aforementioned aspects, it is possible to reduce or eliminate space for placing robot fixtures around the robot and improve the operating efficiency.

REFERENCE SIGNS LIST

10 Machine tool
11 Machining unit
12 Workpiece exchange conveyor
13 Machine tool control device
20 Automatic warehouse
20a Storage space
21 Workpiece storage region
22 Fixture storage region
23 Rail
24 Pickup device
25, 26 Take-out conveyor (Take-out device)
30 Warehouse control device
31 Warehouse controller
33 Memory device
33a System program
33b Management program
33c Fixture exchange program
40 Robot
41 Servo motor
42 Hand placing stand 50 Robot control device
51 Robot controller
53 Memory device
53a System program
53c Fixture exchange operation program
54 Servo controller
55 Teach pendant
70 Automatic warehouse for jigs
70a Storage space
71 Jig storage region
73 Rail
74 Pickup device
80 Warehouse control device
W Workpiece
SP Supply position
H Hand (Robot fixture)
J Jig
RA Robot adaptor
TA Tool adaptor
WP Workpiece pallet
P Pallet

The invention claimed is:

1. A machining system comprising:
    an automatic warehouse that stores workpieces and moves the stored workpieces to a supply position;
    a warehouse controller, comprising a first processor, that receives a request for a workpiece to be moved to the supply position, and controls the automatic warehouse to move the workpiece corresponding to the received workpiece request to the supply position;
    a machine tool that machines the workpieces;
    a robot that transfers the workpieces, which are moved to the supply position by the automatic warehouse, to a machine tool side, in order for the workpiece to be machined by the machine tool;
    a robot controller, comprising a second processor device that controls the robot, wherein
    the automatic warehouse stores hail at least one robot fixture, each fixture may be one of a tool, a hand, and a hand claw to be attached to a tip of the robot,
    the warehouse controller receives a request for flail one of the at least one robot fixture to be moved to the supply position, and controls the automatic warehouse to move the robot fixture corresponding to the received request to the supply position, and
    the robot controller controls the robot to attach thereto the robot fixture supplied to the supply position,
    wherein the automatic warehouse stores at least one jig used for machining by the machine tool,
    the warehouse control device receives a request for one of the at least one jig to be moved to the supply position, and controls the automatic warehouse to move a corresponding jig corresponding to the received request and a jig-carrying hand for carrying the corresponding jig to the supply position, and
    the control device controls the robot to attach thereto the jig-carrying hand moved to the supply position and to carry the corresponding jig moved to the supply position to the machine tool side by the jig-carrying hand.

2. The machining system according to claim 1, wherein the automatic warehouse comprises a plurality of conveyers, each of which conveys the workpieces and/or the robot fixture to a corresponding one of a plurality of the supply positions.

3. The machining system according to claim 1, further comprising a visual sensor that captures an image of the robot fixture supplied to the supply position,
    wherein the robot controller controls the robot to attach thereto the robot fixture supplied to the supply position, using a position and posture of the robot fixture detected based on the image captured by the visual sensor.

4. The machining system according to claim 1, wherein the tool as the robot fixture is a nut runner or a cleaning tool.

5. The machining system according to claim 1, wherein
    the robot fixture is configured to be supplied to the supply position in a state where the robot fixture is put on a pallet, and
    the pallet is configured so that, in a state where the supplied robot fixture is placed on the pallet, another robot fixture can be placed on the pallet.

* * * * *